United States Patent
Kim et al.

(10) Patent No.: US 9,120,949 B2
(45) Date of Patent: *Sep. 1, 2015

(54) POLYESTER BINDER RESIN FOR COATING AND COATING COMPOSITION CONTAINING SAME

(75) Inventors: Dong-Jin Kim, Seoul (KR); Kye-Yune Lee, Gyeonggi-Do (KR)

(73) Assignee: SK Chemicals Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/009,410

(22) PCT Filed: Apr. 5, 2012

(86) PCT No.: PCT/KR2012/002573
§ 371 (c)(1),
(2), (4) Date: Oct. 2, 2013

(87) PCT Pub. No.: WO2012/138145
PCT Pub. Date: Oct. 11, 2012

(65) Prior Publication Data
US 2014/0018484 A1    Jan. 16, 2014

(30) Foreign Application Priority Data
Apr. 6, 2011 (KR) .................. 10-2011-0031554

(51) Int. Cl.
C09D 167/02    (2006.01)
C08G 63/60    (2006.01)
C08G 63/66    (2006.01)
C09D 167/00    (2006.01)

(52) U.S. Cl.
CPC .............. *C09D 167/02* (2013.01); *C08G 63/60* (2013.01); *C08G 63/66* (2013.01); *C09D 167/00* (2013.01)

(58) Field of Classification Search
CPC ...... C08G 63/199; C08G 63/60; C08G 63/66; C09D 167/04
USPC .................... 528/300, 307; 524/604
See application file for complete search history.

(56) References Cited

U.S. PATENT DOCUMENTS

| | | | |
|---|---|---|---|
| 5,731,374 A * | 3/1998 | Good et al. | 524/444 |
| 5,959,066 A | 9/1999 | Charbonneau et al. | |
| 6,063,464 A | 5/2000 | Charbonneau et al. | |
| 7,144,972 B2 * | 12/2006 | Hayes | 528/272 |
| 8,883,386 B2 * | 11/2014 | Yoo et al. | 430/109.4 |
| 2012/0276479 A1 | 11/2012 | Yoo et al. | |

FOREIGN PATENT DOCUMENTS

| | | |
|---|---|---|
| EP | 2 692 763 A2 | 2/2014 |
| JP | 08-003297 A | 1/1996 |
| JP | 2006-96845 * | 4/2006 |
| JP | 2009-242443 A | 10/2009 |
| KR | 10-2009-0073469 A | 7/2009 |
| WO | 2006010061 A1 | 1/2006 |
| WO | WO 2011/083969 A2 | 7/2011 |

OTHER PUBLICATIONS

JP2006096845 A, Japan, English Abstract, Apr. 2006.*
International Search Report for PCT/KR2012/002573 dated Oct. 29, 2012.

* cited by examiner

*Primary Examiner* — Tae H Yoon
(74) *Attorney, Agent, or Firm* — Heslin, Rothenberg, Farley & Mesiti, P.C.

(57) ABSTRACT

Disclosed are a polyester binder resin for coating which is copolymerized with lactic acid or a compound derived therefrom and isosorbide, and thus has a high content of biomass-derived compounds, and exhibits superior coating hardness, contamination resistance, hydrolytic resistance, processability and the like, and a coating composition comprising the same. The polyester resin binder for coating is copolymerized with a diacid component, a diol component comprising 1 to 60 moles of isosorbide, with respect to a total diol component, and 1 to 50% by weight of lactic acid or a compound derived therefrom, with respect to the total amount of resin polymerization reactants, wherein the polyester resin binder for coating has a structure in which a diacid moiety derived from the diacid component, a diol moiety derived from the diol component, and a hydroxyl monoacid moiety derived from the lactic acid or a compound derived therefrom are repeated.

20 Claims, No Drawings

POLYESTER BINDER RESIN FOR COATING AND COATING COMPOSITION CONTAINING SAME

CROSS REFERENCE TO RELATED APPLICATIONS

This application is a national stage filing under section 371 of International Application No. PCT/KR2012/002573 filed Apr. 5, 2012 and published as WO 2012/138145, and claims priority to Korean Patent Application No. 10-2011-0031554 filed on Apr. 6, 2011, the entire disclosure of these applications being hereby incorporated herein by reference.

TECHNICAL FIELD

The present invention relates to a polyester binder resin for coating and a coating composition comprising the same. More specifically, the present invention relates to a polyester binder resin for coating which is copolymerized with lactic acid or a compound derived therefrom and isosorbide, and thus has a high content of biomass-derived compounds, and exhibits superior coating hardness, contamination resistance, hydrolytic resistance and processability, and a coating composition comprising the same.

BACKGROUND ART

In general, a coating composition (coating) should exhibit superior adhesivity to an object, such as metal or a polymer film, to which the coating composition is applied, coating hardness, contamination resistance, hydrolytic resistance and the like. Although excellent in hardness, contamination resistance, hydrolytic resistance or the like, a coating composition using a binder such as an alkyd resin, vinyl resin or silicone resin is greatly restrictive and difficult in practical application, because processability thereof is poor. In order to overcome these disadvantages, use of a high-molecular weight polyester resin as a coating binder is considered. However, high-molecular weight polyester resin binders having a linear structure have superior processability, but have disadvantages of poor coating hardness, contamination resistance, hydrolytic resistance and the like.

In order to improve physical properties of polyester resin binders, Japanese Patent Publication Hei. 2-209979 discloses a method of using an alkylene oxide group adduct of bisphenol-A. This method increases polyester resin molecular weight and thereby enhances processability to some extent and improves adhesivity to metal materials and hardness, but has disadvantages of deteriorating UV stability due to increase in ether bonds caused by excessive introduction of bisphenol-A structure, lowering weather resistance of the coating films, and having a low coating film hardness due to a resin glass transition temperature of 70° C. or less. In addition, Japanese Patent Publication Sho. 62-21830 discloses a polyester resin comprising terephthalic acid and alkylene glycol as main components and the resin is excellent in processability, but is disadvantageously not preferable in terms of hardness and contamination resistance. Japanese Patent Publication Hei 7-18169 discloses a polyester resin prepared using isophthalic acid and anhydrous phthalic acid as main acid components and using a C5 to C6 alcohol component such as neopentyl glycol or 1,6-hexanediol. This method aims to satisfy both hardness and processability, but has limitations in improving coating hardness since inherent resin hardness is low and has a disadvantage of sharp decrease in processability when a tri-functional raw material is used to overcome such limitations.

Meanwhile, generally used resins such as polyester, polycarbonate, polystyrene, polyethylene, polypropylene and styrene-acryl copolymers are obtained from fossil resources such as petroleum. Recently, in response to an increase in carbon dioxide in air due to depletion of fossil resources and mass consumption of petroleum resources and thus global warming problems, attempts to reduce consumption of fossil fuels are underway. For example, when resins derived from plants, which grow while emitting carbon dioxide to air, are used, carbon dioxide is circulated in the environment, helping to solve global warming and petroleum resource depletion problems.

Regarding such an environment-circulating resin (polymer), an increase in biomass raw material content (organism total amount or bio-content) is preferred. Biomass means an organic living system such as a plant, a microorganism, a fungi and an animal which gets a solar energy. Biomass raw materials include environment-circulating resources derived from plants including starch-based resources such as cereals and potatoes, cellulose-based resources such as herbs, trees, rice straw and bran, and saccharine-based resources such as sugar cane and sugar beet, environment-circulating resources derived from animals such as livestock excretions and carcasses, and microbial cells, and organic waste derived from these resources such as paper and food waste. Biomass raw material is recyclable, is not depleted unlike fossil fuels and is eco-friendly since carbon dioxide emitted to air by combustion is also circulated in a natural state. Such biomass raw material can be used as an energy source or a raw material for various synthetic products and can be used as an alternative to conventional petrochemical products by applying a biological or chemical technique to the biomass raw material.

Accordingly, recently, a method of improving heat resistance of a polyester resin using isosorbide which is a kind of biomass-derived compound represented by the following Formula 1 and derived from starch as a co-monomer of the polyester resin has been developed.

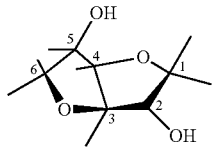

Formula 1

As isosorbide is a secondary alcohol and thus has a low reactivity, isosorbide is known to be difficult to prepare high-viscosity polyesters used for production of sheets or bottles. However, U.S. Pat. No. 5,959,066 discloses a method for preparing polyester having an intrinsic viscosity of 0.35 dig or more by melt polymerization using various diols comprising terephthalic acid and isosorbide. Polyester resins having an intrinsic viscosity of 0.35 dig or more are used for optical products and coating applications, polyester resins having an intrinsic viscosity of 0.4 dig or more are used for CD, and polyester resins having an intrinsic viscosity of 0.5 dig or more are used for bottles, films, sheets, injection applications and the like. In addition, U.S. Pat. No. 6,063,464 discloses a method for preparing polyester having an intrinsic viscosity of 0.15 dig or more by melt polymerization using a glycol component comprising isosorbide. In the patents described above, a total content of the biomass-derived compound is maintained at a low level although polyester is prepared using ordinary polyester polymerization raw materials, methods and catalysts, and isosorbide.

DISCLOSURE

Technical Problem

Accordingly, it is one aspect of the present invention to provide a polyester binder resin for coating which comprises isosorbide and lactic acid or a compound derived therefrom as plant-derived environment-circulating polymerization raw materials and thus has a high biomass raw material content and is eco-friendly, and a coating composition comprising the same.

It is another aspect of the present invention to provide a polyester binder resin for coating which exhibits superior coating hardness due to high glass transition temperature and are excellent in terms of contamination resistance, hydrolytic resistance, processability and the like, and a coating composition comprising the same.

It is another aspect of the present invention to provide a polyester binder resin which is useful for coating of can inner sides, household appliances, construction exterior materials and the like, and a coating composition comprising the same.

Technical Solution

In accordance with one aspect of the present invention, the above and other objects can be accomplished by the provision of a polyester resin binder for coating, copolymerized with a diacid component, a diol component comprising 1 to 60 moles of isosorbide, with respect to a total diol component, and 1 to 50% by weight of lactic acid or a compound derived therefrom, with respect to the total amount of resin polymerization reactants, wherein the polyester resin binder for coating has a structure in which a diacid moiety derived from the diacid component, a diol moiety derived from the diol component, and a hydroxyl monoacid moiety derived from the lactic acid or a compound derived therefrom are repeated.

In accordance with another aspect of the present invention, provided is a coating composition comprising 10 to 60% by weight of the polyester resin binder for coating, and the balance of an organic solvent.

Advantageous Effects

The polyester binder resin and the coating composition according to the present invention are prepared using both isosorbide and lactic acid or a compound derived therefrom as biomass-derived compounds and are thus eco-friendly, and enable formation of coating films with superior hardness, contamination resistance, hydrolytic resistance, processability and scratch resistance and are thus useful for industrial coating applications including coating of can inner sides, household appliances and construction exterior materials.

Hereinafter, the present invention will be described in detail.

The polyester resin binder for coating according to the present invention is copolymerized with a diacid component, a diol component and lactic acid or a compound derived therefrom and thus has a structure in which a diacid moiety obtained from the diacid component, a diol moiety obtained from the diol component and a hydroxy-monoacid moiety obtained from the lactic acid or a compound derived therefrom are repeated.

The diacid component used for preparation of the copolymer polyester resin binder for coating comprises a dicarboxylic acid component selected from the group consisting of a C8 to C14 aromatic dicarboxylic acid component and a C4 to C12 aliphatic dicarboxylic acid component. The C8 to C14 aromatic dicarboxylic acid component comprises an aromatic dicarboxylic acid component commonly used for preparation of polyester resins, such as terephthalic acid, isophthalic acid, naphthalene dicarboxylic acid, for example, 2,6-naphthalene dicarboxylic acid and diphenyl dicarboxylic acid, and the C4 to C12 aliphatic dicarboxylic acid component comprises a linear, branched or cyclic aliphatic dicarboxylic acid component commonly used for preparation of polyester resins, such as cyclohexane dicarboxylic acid, for example, 1,4-cyclohexane dicarboxylic acid and 1,3-cyclohexane dicarboxylic acid, phthalic acid, sebacic acid, succinic acid, isodecylsuccinic acid, maleic acid, fumaric acid, adipic acid, glutaric acid and azelaic acid. The dicarboxylic acid component may be used alone or in combination of two or more types thereof and is preferably terephthalic acid, isophthalic acid or a mixture thereof. With respect to the total amount of the diacid component, a content of the terephthalic acid and/or isophthalic acid component is preferably 30 to 100 mol %, more preferably 50 to 100 mol %, most preferably 70 to 100 mol %, for example, 70 to 99 mol %, 70 to 95 mol % or the like, and the remaining component is other aromatic or aliphatic dicarboxylic acid component excluding the terephthalic acid and/or isophthalic acid. Here, when a content of the terephthalic acid and/or isophthalic acid component is excessively low, hardness may be decreased after coating due to excessively low Tg of the polyester resin. In the present specification, the term "terephthalic acid component" or the like means terephthalic acid, an alkyl ester thereof (C1 to C4 lower alkyl ester such as monomethyl, monoethyl, dimethyl, diethyl or dibutyl ester) and/or an ester-forming derivative component such as an acid anhydride thereof, and the terephthalic acid component reacts with a glycol component to form a terephthaloyl moiety. In addition, in the present specification, the diacid moiety, the diol moiety and the hydroxyl monoacid moiety mean residues remaining after removal of hydrogen, hydroxyl groups and alkoxy groups when the diacid, diol and hydroxyl monoacid components are polymerized into polyesters by a common condensation reaction. Accordingly, the polyester resin according to the present invention has a structure in which a hydroxy monoacid moiety is inserted into an ordinary polyester structure in which the diacid moieties and diol moieties alternately repeat. The diol component used herein, with respect to the total amount of the diol component, comprises (i) 1 to 60 mol %, preferably 10 to 55 mol %, more preferably 30 to 50 mol % of isosorbide (1,4:3,6-anhydroglucitol) and (ii) 40 to 99 mol %, preferably 45 to 95 mol %, more preferably 50 to 95 mol %, most preferably 70 to 90 mol % of glycol selected from the group consisting of ethylene glycol, diethylene glycol, triethylene glycol, propanediol (such as 1,2-propanediol or 1,3-propanediol), butanediol (such as 1,4-butanediol), pentanediol, hexanediol (such as 1,6-hexanediol), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, 1,4-cyclohexanedimethanol, tetramethylcyclobutanediol and mixtures thereof, as a copolymerization monomer for securing solubility of a polyester resin in an industrial solvent.

The lactic acid or a compound derived therefrom used for the present invention is a compound which has both acidic properties and alcohol properties and examples thereof include D-lactic acid, L-lactic acid, and D- or L-lactide produced from lactic acid. A content of the lactic acid or a compound derived therefrom is 1 to 50% by weight, preferably 10 to 45% by weight, more preferably 15 to 40% by weight, with respect to the total amount of resin polymerization reactants. The lactic acid or a compound derived therefrom is preferably used in a great amount so long as it does not have negative effects on physical properties (heat resistance, color or the like) of the coating resin. However, when the amount thereof is excessively high, hardness and solvent solubility of the polyester resin may be deteriorated. Regarding the polyester resin according to the present invention, with respect to the total amount of polyester resin polymerization raw materials, a content of a biomass raw material component containing the isosorbide, and the lactic acid or a compound derived therefrom is preferably 5 to 70% by weight, more preferably 20 to 60% by weight, most preferably 30 to 50% by weight, and a content of a petroleum resource-derived compound comprising the diacid and diol components is 30 to 95% by weight, preferably 40 to 80% by weight. When the content of the biomass raw material component is lower than 5% by weight, use of the biomass raw material is meaningless and when the content thereof exceeds 70% by weight, solvent solubility, coating properties or the like of the prepared polyester resin may be poor.

Next, a method for preparing the polyester resin according to the present invention will be described in detail. First, (i) a diacid component comprising an aromatic dicarboxylic acid component, an aliphatic dicarboxylic acid component or the like, (ii) a diol component comprising 1 to 60 mol % of isosorbide, and for example, 1 to 90 mol % of ethylene glycol and optionally other glycol component, and (iii) 1 to 50% by weight of a polymerization reactant comprising lactic acid or a compound derived therefrom, with respect to the total amount of resin polymerization reactants, are subjected to esterification or transesterification at a pressure of 0.1 to 3.0 kgf/cm$^2$ and at a temperature of 200 to 300° C. for a mean retention time of 100 minutes to 10 hours. Then, the esterification or transesterification product is subjected to polycondensation at a reduced pressure of 400 to 0.1 mmHg and at a temperature of 240 to 300° C. for a mean retention time of 1 to 10 hours to prepare a polyester resin binder according to the present invention (b). Preferably, the final vacuum of the polycondensation reaction is lower than 2.0 mmHg, and the esterification and polycondensation reactions are carried out under an inert gas atmosphere.

The method for preparing the polyester resin according to the present invention will be described in more detail. In the preparation of a copolymerization polyester using the diacid component such as terephthalic acid, the diol component such as isosorbide, and lactic acid and the like, the diacid and diol components are added such that a molar ratio of the diacid component to the diol component is 1.05 to 3.0, 1 to 50% by weight of lactic acid or a compound derived therefrom, with respect to the total amount of resin polymerization reactants, is further added and esterification reaction is performed at a temperature of 200 to 300° C., preferably 240 to 260° C., more preferably 245 to 255° C. and an elevated pressure of 0.1 to 3.0 kgf/cm$^2$, preferably 0.2 to 2.0 kgf/cm$^2$. Here, when the molar ratio of the diol component to the diacid component is lower than 1.05, the unreacted acid component is left during the polymerization reaction and transparency of the resin may be deteriorated, and when the molar ratio exceeds 3.0, production efficiency of the resin may be deteriorated due to excessively low polymerization reaction rate. The esterification reaction time (mean retention time) is commonly about 100 minutes to about 10 hours, preferably about 2 hours to about 500 minutes and is changed according to reaction temperature and pressure, and the ratio of the diacid component to diol component. When the preparation process of the polyester resin is divided into an esterification reaction (first step) and a polycondensation reaction (second step), a catalyst is not required for the esterification reaction, but may be used in order to reduce reaction time.

After the esterification reaction, the polycondensation reaction is performed. Before initiation of the polycondensation reaction, a polycondensation catalyst, a stabilizer or the like may be added to an esterification reaction product. As the polycondensation catalyst, at least one of ordinary titanium-, germanium-, antimony-, aluminum- and tin-based compounds may be suitably selected. When the germanium-based catalyst among these compounds is used, color of the polyester resin is advantageously excellent, when compared to the antimony-based and titanium-based catalysts. As the stabilizer added during the polycondensation reaction, a phosphorus compound such as phosphoric acid, trimethyl phosphate or triethyl phosphate may generally be used, and an amount of the stabilizer added is 10 to 100 ppm with respect to the final polyester weight, based on a phosphorus element amount. When the amount of added stabilizer is lower than 10 ppm, the polymer (polyester) may be yellowed due to insufficient stabilization effects, and when the amount thereof exceeds 100 ppm, a polymer with a desired high polymerization degree may not be obtained. In addition, a coloring agent added to improve color of the polymer is cobalt acetate and the polycondensation reaction is generally performed at 240 to 300° C., preferably 250 to 290° C., more preferably 260 to 280° C. and at a reduced pressured of 400 to 0.1 mmHg. The reduced pressure condition aims at removing a polycondensation reaction by-product, i.e., glycol. The polycondensation reaction is performed for a time required to obtain a desired intrinsic viscosity, for example, for a mean retention time of 1 to 10 hours. In the polymerization of the polyester according to the present invention, if necessary, in addition to the diacid component, the diol component and the lactic acid or a compound derived therefrom, a small amount (for example, 0 to 10 mol %, specifically 0.1 to 10 mol %, of the total amount of reactants) of triacid and/or trivalent alcohol component (for example, trimellitic acid, trimethylol propane or the like) may be further added. The polyester resin according to the present invention has an intrinsic viscosity measured at 35° C. after the polyester resin is dissolved in ortho-chlorophenol (OCP) at a concentration of 1.2 g/dl, of 0.15 dl/g or more, preferably 0.5 dl/g or more. The polyester resin binder according to the present invention generally has a number average molecular weight (Mn) of 2,000 to 20,000, preferably 5,000 to 15,000, and generally has a hydroxyl value of 2 to 60 mg KOH/g, preferably 5 to 50 mg KOH/g, generally has an acid value of 0.1 to 20 mg KOH/g, preferably 1 to 5 mg KOH/g, and preferably has a glass transition temperature (Tg) of 10 to 150° C., more preferably 60 to 120° C., most preferably 80 to 105° C. When the number average molecular weight (Mn) is outside the range defied above, physical properties of the coating film may be deteriorated, and when the hydroxyl value and the acid value are excessively high, outer appearance defects and a popping phenomenon may be generated due to rapid curing upon high-temperature baking (curing caused by thermal treatment). In addition, when the glass transition temperature is excessively high, processability of the coating film may be deteriorated and when the glass transition temperature is excessively low, hardness of the coating film may be deteriorated.

The coating composition according to the present invention is a solvent-based coating composition and comprises 10 to 60% by weight, preferably 15 to 50% by weight, more preferably 20 to 45% by weight of the polyester resin binder and the balance, preferably 30 to 90% by weight, more preferably 35 to 85% by weight, even more preferably 40 to 71% by weight, most preferably 44 to 64% by weight of an organic solvent, with respect to the total amount of the coating composition. When the content of the polyester resin is excessively low, coating viscosity is excessively deteriorated, and when the content thereof is excessively high, coating properties may be poor due to excessively high viscosity. In addition, if necessary, the coating composition according to the present invention may further comprise 3 to 13% by weight of a cross-linking agent, 0.1 to 1.5% by weight of a curing catalyst, 0.3 to 10% by weight of a slipping additive, 0.5 to 1.0% by weight of a leveling agent, 0.5 to 1.0% by weight of a defoaming agent, and 0 to 40% by weight, preferably 10 to 30% by weight of a pigment. Hereinafter, respective components of the coating composition will be described in detail.

1. Cross-Linking Agent

A cross-linking agent forms a coating film together with a polyester resin binder component, an ordinary cross-linking agent may be used as the cross-linking agent without limitation, and examples thereof include melamine-, isocyanate-, carbodiimide-, epoxy-based cross-linking agents. As the melamine-based cross-linking agents, a melamine resin containing an amino group or a butoxy group and a melamine resin containing a methoxy group may be used. The melamine resin containing an amino group or a butoxy group is advantageous in improving hardness of the coating film, but has drawbacks of low reaction rate upon high-temperature baking and bad processability, as compared to methoxy melamine resins, when an acid catalyst is used. On the other hand, when the methoxy melamine resin is used in conjunction with the acid catalyst, curing reaction rate is high and processability of the coating film is excellent, but hardness of the coating film is relatively poor. Accordingly, in the present invention, in order to maintain balance between hardness and processability of the coating film, a mixture of an amino- or butoxy-type melamine resin and a methoxy-type melamine resin in a weight ratio of 0.3:1 to 0.5:1 is preferably used. When a mix ratio of the amino- or butoxy-type melamine resin is lower than 0.3, processability of the coating film is excellent, but surface hardness of the coating film is deteriorated, and when the mix ratio exceeds 0.5, processability of the coating film is poor and viscosity is excessively increased during coating storage. The coating composition of the present invention uses 2 to 8% by weight of a methyl-etherified melamine resin having a methoxy group and 1 to 5% by weight of a melamine resin having an amino group or a butoxy group. A sum of the curing agents is 3 to 13% by weight, with respect to the total amount of the coating composition. Examples of the methoxy-type melamine resin include CYMEL 303 and CYMEL 301 produced by Cytec Industries Inc., BE 3747 and BE 3745 produced by BIP Co., Ltd., RESIMENE 745 produced by Monsanto Company and the like. Examples of the amino- or butoxy-type melamine resin include CYMEL 325 and CYMEL 327 produced by Cytec Industries Inc., BE 3748 and BE 3040 produced by BIP Co., Ltd., RESIMENE 717 produced by Monsanto Company and the like. Furthermore, ordinary isocyanate-, carbodiimide-epoxy-based curing agents may be used as cross-linking agents. When an amount of the cross-linking agent used is excessively small, the coating film is not sufficiently cured and physical properties such as solvent resistance or hardness of the coating film are poor, and when the amount thereof is excessively high, the overall physical properties of the coating film may be poor since the cross-linking agent acts as a foreign material.

2. Curing Catalyst

The curing catalyst that can be used for the coating composition of the present invention functions to facilitate curing of the coating film, an ordinary curing catalyst may be used without limitation, sulfonic acid-, amine- and tin-based curing catalysts are preferred, and specific examples thereof include substances obtained by neutralizing sulfonic acid such as p-toluene sulfonic acid (p-TSA), dinonylnaphthalene sulfonic acid (DNNSA), dinaphthalene disulfonic acid (DNNDSA) or fluorosulfonic acid, with amine or epoxy. The amine or epoxy is added so as to block catalytic reaction, and examples of the amine include primary amines, secondary amines, tertiary amines and the like. In general, primary amine causes color change such as yellowing of a coating film and tertiary amine causes surface contraction of the coating film upon use of an excessive amount. Accordingly, use of secondary amine is preferred. Examples of the secondary amines include diethylamine, diisopropylamine, diisopropanolamine, di-n-propylamine, di-n-butylamine, diisobutylamine, di-sec-butylamine, diallylamine, diamylamine, N-ethyl-1,2-dimethylpropylamine, N-methylhexylamine, di-n-octylamine, piperidine, 2-pipecoline, 3-pipecoline, 4-pipecoline, morpholine and the like. Contamination resistance of the coating film can be improved by adding an active amount of the amine to the coating composition. When a catalyst not-neutralized with amine or epoxy is used, viscosity may increase after storage of coating, or physical properties of the coating film may be deteriorated. Examples of commercially available p-toluene sulfonic acids include NACURE 2500, NACURE 2510 and NACURE 2530 produced by King Co., Ltd., examples of commercially available DNNSA include NACURE 1323, NACURE 1419 and NACURE 1557 produced by King Co., Ltd., examples of commercially available DNNDSA include NACURE 3525, NACURE 3525 and NACURE 3327 produced by King Co., Ltd., and examples of commercially available fluorosulfonic acids include FC520 produced by 3M Company. Furthermore, as an auxiliary curing catalyst, p-toluene sulfonic acid, dinonylnaphthalenesulfonic acid (DNNSA) or the like, neutralized with tertiary amine, may be used. The curing catalyst is present in an amount of 0.1 to 1.5% by weight, with respect to the total amount of the coating composition. When the amount of the curing catalyst is excessively small, physical properties, such as sufficient hardness, of the coating film, are not obtained due to long curing time, and when the amount thereof is excessively high, the curing catalyst acts as a foreign material and thus may cause deterioration in the overall physical properties of the coating film.

3. Solvent

The coating composition of the present invention comprises an organic solvent in consideration of ease of handling, coating workability or the like. As the organic solvent, any organic solvent may be used without limitation so long as it disperses a polyester resin and other components and is readily removed. As the organic solvent, an aromatic hydrocarbon-, glycol ester-, glycol ether-, ketone- or alcohol-solvent may be used alone or in combination thereof. Examples of the aromatic hydrocarbon-based solvent include toluene, xylene, kocosol (#100, #150) commercially available from SK energy Corporation and the like, examples of the glycol ester-based solvent include ethyl acetate, (n)-butyl acetate, cellosolve acetate, propylene glycol monomethyl acetate, ethylene glycol diacetate, ethylene glycol diethyl ether, ethylene glycol dimethyl ether, ethylene glycol monobutyl ether, ethylene glycol monoethyl ether, 3-methoxybutyl acetate and the like. Examples of the glycol ether-based solvent include methyl cellosolve, ethyl cellosolve, ethylene glycol butyl ether, diethylene glycol methyl ether, diethylene glycol ethyl ether, diethylene glycol butyl ether and the like, examples of the ketone-based solvent include acetone, acetonitrile, methyl ethyl ketone, methyl isobutyl ketone, cyclohexanone and the like, examples of the alcohol-based solvent include ethanol, isopropanol, n-butanol, amyl alcohol, cyclohexanol and the like, and other solvents such as chloroform, cresol, hexane, tetrahydrofuran, isophorone and dibasic ethers may be also used. The solvent constitutes the remaining component (balance) of the total amount of the coating composition. When an amount of the solvent used is excessively small, adhesivity of the coating film may be deteriorated and when the amount thereof is excessively high, a long period of time is disadvantageously required for drying.

4. Other Additive

The slipping additive that may be contained in the coating composition of the present invention functions to prevent formation of scratches by operators during molding, and formation of scratches by nails of household appliance users. An ordinary slipping additive may be used without limitation. Examples of the slipping additive include polyethylene (PE) waxes, polytetrafluoroethylene (PTFE) waxes, PTFE/PE waxes and the like. An amount of the polyethylene wax used is preferably 3 to 5% by weight with respect to the total amount of the coating composition. When the amount is below this range, sufficient slipping property may not be imparted to the coating film, and when the amount exceeds this range, gloss of the coating film may be deteriorated. When the PTFE wax is used, orientation to the surface is slow during curing of the coating film since hardness of PTFE is high, but gravity of PTFE is higher than that of a resin, and outer appearance of the coating film is rough and slipping property is not sufficiently exerted due to high melting point of PTFE. Accordingly, a wax containing a combination of PTFE and PE is preferred because superior balance between respective physical properties is possible since a PE wax has superior surface orientation, but a low slipping effect, while PTFE has superior slipping effect, but has surface orientation problems. Such a PTFE/PE combination wax should be prepared using a high-speed dispersion machine. This aims at obtaining a product having a structure in which a PTFE wax is adhered around a PE wax having a low density, that is, a structure in which a PTFE wax is adhered around a PE wax having a large particle size by electrostatic force. A coating film using such a combination-type wax has superior hardness and sufficient slipping property, but outer appearance of the coating film is deteriorated when PTFE/PE wax particles are excessively large. For this reason, the PTFE/PE wax preferably has a particle diameter of 3 µm or less. When an excess of the slipping additive is used, gloss of the coating film may be deteriorated. Examples of commercially available products of the wax include MPI-31, F-600XF and the like produced by Micro Powder Inc. Co., Ceraflour 995 and Ceraflour 996 produced by BYK, and SL-524 and SL-409 produced by Daniel Products Inc. Meanwhile, conventional silicone oils are not preferable for use as slipping additives, since surface tension of such silicone oils is excessively low and continuous roll-coating workability is bad. In addition, in order to improve workability, an additive such as clay, amide or fumed silica is used in an amount of 0.1 to 1% by weight.

In addition, in order to maintain evenness of the coating film and improve defoaming property during coating, an ordinary acrylic, vinyl or silicone leveling agent and an ordinary defoaming agent may be used. Examples of commercially available leveling agents and defoaming agents include DISPARLON L-1980, DISPARLON L-1984 and DISPARLON AP-30 produced by Kusumoto Chemicals Ltd., and BYK 356 and BYK 410 produced by BYK Company and the like. In addition, the coating composition of the present invention may be used as a transparent coating composition containing no pigment, or may be used as a color coating composition containing a color pigment. Examples of the color pigment include organic color pigments such as cyanine blue or cyanine green which are color pigments applicable to the coating composition field, and inorganic color pigments such as titanium oxide, iron oxide, carbon black, chromium yellow and various baking pigments. Furthermore, the coating composition of the present invention may comprise extender pigments such as talc, clay, silica, mica and alumina, and metal or non-metal fillers and the like. When an amount of the pigment used is excessively high, adhesivity of the dried coating film, dispersibility of the pigment and the like may be deteriorated.

EXAMPLES

Hereinafter, the present invention will be described in more detail with reference to Examples and Comparative Examples. The following examples are provided for illustration only and should not be construed as limiting the scope of the present invention. In the following Examples and Comparative Examples, unless mentioned otherwise, unit "part" or "%" means "part by weight" or "% by weight", TPA means terephthalic acid, IPA means isophthalic acid, AA means adipic acid, TMA means trimellitic acid, ISB means isosorbide (1,4:3,6-dianhydroglucitol), EG means ethylene glycol, NPG means neopentyl glycol, TMP means trimethylol propane, and lactide means L-lactide. A quality testing method of the polymer and coating composition is as follows.

(1) Intrinsic viscosity (IV): A polymer was dissolved in orthochlorophenol at 150° C. at a concentration of 0.12% and an intrinsic viscosity of the polymer was measured in a 35° C. constant temperature bath using an Ubbelohde viscometer.

(2) Heat resistance (Tg): glass transition temperature (Glass-rubber transition temperature: Tg) measured at a temperature elevation rate of 10° C./min upon $2^{nd}$ scanning.

(3) Number average molecular weight: number average molecular weight of a solution of a copolymerization polyester resin in tetrahydrofuran was measured by gas chromatography using polystyrene as a standard.

(4) Bio content (%): a sum of contents of respective components of biomass polymerization raw materials in resin measured using 600 MHz nuclear magnetic resonance (NMR) spectrometer (5) Magic contamination: A zinc-coated steel plate with a thickness of 0.5 mm was coated with a coating composition (coating) and dried in a hot air dryer at 270° C. for 50 seconds to produce a coated steel plate. Lines were formed on the steel sheet using red, blue and black oily magic pens, allowed to stand for 30 minutes and cleaned with a gauze wetted with xylene, and the presence of traces was observed.

(6) Pencil hardness: coating hardness of the same steel sheet as that used in the "magic contamination" was measured using a Mitsubishi pencil.

(7) Processability: when the same steel sheet as that used in the "magic contamination" was inserted between steel sheets with the same thickness and was fully bent by 180 degrees, the number of steel sheets inserted when cracks of the coating film are not generated was observed using a 30× magnifier.

(8) Accelerated weathering: after the same coated steel sheet as that used in "magic contamination" was tested using a QUV-accelerated weathering tester (produced by Q-Panel Lab Products) for 7,000 hours, a ratio of gloss maintenance with respect to initial gloss was represented as percentage (%). Cycles including condensation at 50° C. for 4 hours and QUV-A (340 nm) UV radiation at the same temperature for 8 hours were used as accelerated weathering testing conditions.

Examples 1 to 3 and Comparative Examples 1 to 2

A. Preparation of Copolymerization Polyester

In accordance with the composition shown in the following Table 1, an acid component and an alcohol component were added to a 500 ml 3-neck flask, 200 ppm of a germanium-based catalyst and 70 ppm of a phosphate-based stabilizer were further added thereto, and esterification reaction was performed by heating at 240 to 300° C. When water as a by-product was eluted to the outside of a system in 70 to 99%, polycondensation reaction was performed and polymerization was completed at a predetermined viscosity. The catalyst and the stabilizer were added in units of ppm with respect to the total raw material amount, based on respective center elements of catalyst and stabilizer molecules. Properties of the polyester thus obtained were measured and shown in TABLE 1.

anone/Solvesso #150 (30/30/40, weight ratio) to prepare a resin solution having a solid content of 50% by weight, a dispersion mix was prepared using the resin solution shown in Table 2 and a coating composition was prepared by solution mixing as shown in Table 3.

TABLE 2

| Dispersion mix | |
| --- | --- |
| TiO$_2$ (Rutile type) | 100 g |
| 50 wt % resin solution | 110 g |
| Cellosolve acetate/Solvesso 150 (1/1) mixed solvent | 50 g |
| Wetting agent: Modaflow (Monsanto Company product, USA) | 0.1 g |

TABLE 3

| Solution mix | |
| --- | --- |
| Dispersion mix | 250 g |
| 50 wt % resin solution | 71.4 g |
| Cymel 303 (produced by Cytec Industries Inc.)* | 14.3 g |
| n-butanol | 8.1 g |
| 50% dinonyl naphthalene sulfonyl acetate solution | 4.0 g |

TABLE 1

| Items | Raw material names | Examples | | | | | | Comparative Examples | | | | |
| --- | --- | --- | --- | --- | --- | --- | --- | --- | --- | --- | --- | --- |
| | | 1 | 2 | 3 | 4 | 5 | 6 | 1 | 2 | 3 | 4 | 5 |
| Acid component (g) | TPA | 17.3 | 16.0 | 12.0 | 20.1 | 17.3 | 17.3 | 21.5 | 20.0 | 18.2 | 21.5 | 21.5 |
| | IPA | 35.2 | 32.5 | 24.5 | 20.1 | 35.2 | 35.2 | 43.6 | 40.5 | 18.2 | 43.6 | 43.6 |
| | AA | | | | 10.5 | | | | | 9.4 | | |
| | TMA | | | | | | 2.6 | | | | 3.1 | |
| Alcohol component (g) | EG | 4.9 | 0 | 0 | 4.9 | 4.9 | 4.9 | 6.1 | 0 | 6.1 | 6.1 | 6.1 |
| | NPG | 18.1 | 16.7 | 12.6 | 18.1 | 18.1 | 18.1 | 22.4 | 20.9 | 22.4 | 22.4 | 22.4 |
| | ISB | 18.5 | 27.7 | 20.9 | 18.5 | 18.5 | 18.5 | 22.9 | 34.9 | 22.9 | 22.9 | 22.9 |
| | TMP | | | | | | 1.9 | | | | | 2.3 |
| Lactic acid component (g) | Lactide | 19.6 | 19.8 | 39.6 | 19.6 | 19.6 | 19.6 | 0 | 0 | 0 | 0 | 0 |
| Properties | IV(dl/g) | 0.35 | 0.29 | 0.32 | 0.42 | 0.37 | 0.36 | 0.31 | 0.25 | 0.39 | 0.34 | 0.33 |
| | Tg (° C.) | 84 | 103 | 95 | 56 | 83 | 80 | 93 | 112 | 65 | 92 | 90 |
| | Mn | 9200 | 7800 | 8600 | 12000 | 7800 | 8100 | 8900 | 7300 | 11000 | 7600 | 7800 |
| | Bio content (%) | 33 | 41 | 54 | 33 | 32 | 32 | 18 | 29 | 18 | 17 | 17 |

B. Preparation of Coating Material

Each copolymerization polyester resin prepared in Examples and Comparative Examples was dissolved in a mixed solvent consisting of cellosolve acetate/cyclohex- C. Physical Property Testing of Coating Material:

A steel plate was coated with the prepared coating material and physical properties of the coated film were measured. The results are shown in the following Table 4.

TABLE 4

| Items | Examples | | | | | | Comparative Examples | | | | |
|---|---|---|---|---|---|---|---|---|---|---|---|
| | 1 | 2 | 3 | 4 | 5 | 6 | 1 | 2 | 3 | 4 | 5 |
| Pencil hardness | 1H | 3H | 2H | F | 2H | 2H | 2H | 4H | F | 3H | 3H |
| Magic contamination resistance | ⊚○ | ⊚ | ⊚ | ○ | ⊚○ | ⊚○ | ⊚ | ⊚ | ○ | ⊚○ | ⊚○ |
| Accelerated weathering (gloss maintenance) | 93 | 99 | 95 | 90 | 93 | 93 | 95 | 99 | 96 | 94 | 94 |
| Processability | 1T | 3T | 2T | 0T | 2T | 2T | 4T | 5T | 1T | 3T | 3T |

As can be seen from Table 4 above, the polyester binder resin and the coating composition according to the present invention comprise great amounts of isosorbide and lactic acid or a compound derived therefrom as biomass-derived compounds and enable formation of coating films with superior hardness, contamination resistance, hydrolytic resistance, processability and scratch resistance.

INDUSTRIAL APPLICABILITY

The polyester binder resin and the coating composition according to the present invention are useful for industrial coating applications including coating of can inner sides, household appliances and construction exterior materials.

The invention claimed is:

1. A polyester resin binder for coating, copolymerized with
   a diacid component comprising 70 to 100 mol % of terephthalic acid, isophthalic acid, and mixtures thereof,
   a diol component comprising 10 to 55 mol % of isosorbide, with respect to a total diol component, and
   1 to 50% by weight of lactic acid or a compound derived therefrom, with respect to the total amount of resin polymerization reactants,
   wherein the polyester resin binder for coating has a structure in which a diacid moiety derived from the diacid component, a diol moiety derived from the diol component, and a hydroxyl monoacid moiety derived from the lactic acid or a compound derived therefrom are repeated,
   wherein the polyester resin binder has a glass transition temperature (Tg) of 80 to 150° C.,
   wherein the diol component further comprises 45 to 90 mol % of glycol selected from the group consisting of ethylene glycol, diethylene glycol, triethylene glycol, propanediol, 1,4-butanediol, pentanediol, hexanediol, neopentyl glycol, 1,2-cyclohexanediol, 1,4-cyclohexanediol, 1,2-cyclohexanedimethanol, 1,3-cyclohexanedimethanol, 1,4-cyclohexanedimethanol, tetramethyl cyclobutanediol, and mixtures thereof.

2. The polyester resin binder for coating according to claim 1, wherein, with respect to the total amount of resin polymerization reactants, a content of a biomass raw material component comprising the isosorbide and the lactic acid or a compound derived therefrom is 5 to 70% by weight, and a content of a petroleum resource-derived compound comprising the diacid component and the diol component is 30 to 95% by weight.

3. The polyester resin binder for coating according to claim 1, wherein the lactic acid or a compound derived therefrom is selected from the group consisting of D-lactic acid, L-lactic acid, D-lactide and L-lactide.

4. The polyester resin binder for coating according to claim 1, wherein the polyester resin is copolymerized using 0 to 10 mol % of a triacid and/or trivalent alcohol component, with respect to the total amount of reactants.

5. The polyester resin binder for coating according to claim 1, wherein the polyester resin has a number average molecular weight (Mn) of 2,000 to 20,000, a hydroxyl value of 2 to 60 mgKOH/g, and an acid value of 0.1 to 20 mgKOH/g.

6. A coating composition comprising: 10 to 60% by weight of the polyester resin binder for coating according to claim 1; and the balance of an organic solvent.

7. The coating composition according to claim 6, wherein the organic solvent is selected from the group consisting of aromatic hydrocarbon-, glycol ester-, glycol ether-, ketone-, alcohol-based solvents and mixtures thereof.

8. The coating composition according to claim 6, further comprising: 3 to 13% by weight of a cross-linking agent; 0.1 to 1.5% by weight of a curing catalyst; 0.3 to 10% by weight of a slipping additive; 0.5 to 1.0% by weight of a leveling agent; 0.5 to 1.0% by weight of a defoaming agent; and 0 to 40% by weight of a pigment.

9. A coating composition comprising: 10 to 60% by weight of the polyester resin binder for coating according to claim 2; and the balance of an organic solvent.

10. The coating composition according to claim 9, wherein the organic solvent is selected from the group consisting of aromatic hydrocarbon-, glycol ester-, glycol ether-, ketone-, alcohol-based solvents and mixtures thereof.

11. The coating composition according to claim 9, further comprising: 3 to 13% by weight of a cross-linking agent; 0.1 to 1.5% by weight of a curing catalyst; 0.3 to 10% by weight of a slipping additive; 0.5 to 1.0% by weight of a leveling agent; 0.5 to 1.0% by weight of a defoaming agent; and 0 to 40% by weight of a pigment.

12. A coating composition comprising: 10 to 60% by weight of the polyester resin binder for coating according to claim 3; and the balance of an organic solvent.

13. The coating composition according to claim 12, wherein the organic solvent is selected from the group consisting of aromatic hydrocarbon-, glycol ester-, glycol ether-, ketone-, alcohol-based solvents and mixtures thereof.

14. The coating composition according to claim 12, further comprising: 3 to 13% by weight of a cross-linking agent; 0.1 to 1.5% by weight of a curing catalyst; 0.3 to 10% by weight of a slipping additive; 0.5 to 1.0% by weight of a leveling agent; 0.5 to 1.0% by weight of a defoaming agent; and 0 to 40% by weight of a pigment.

15. A coating composition comprising: 10 to 60% by weight of the polyester resin binder for coating according to claim 4; and the balance of an organic solvent.

16. The coating composition according to claim 15, wherein the organic solvent is selected from the group consisting of aromatic hydrocarbon-, glycol ester-, glycol ether-, ketone-, alcohol-based solvents and mixtures thereof.

17. The coating composition according to claim 15, further comprising: 3 to 13% by weight of a cross-linking agent; 0.1 to 1.5% by weight of a curing catalyst; 0.3 to 10% by weight of a slipping additive; 0.5 to 1.0% by weight of a leveling agent; 0.5 to 1.0% by weight of a defoaming agent; and 0 to 40% by weight of a pigment.

18. A coating composition comprising: 10 to 60% by weight of the polyester resin binder for coating according to claim 5; and the balance of an organic solvent.

19. The coating composition according to claim 18, wherein the organic solvent is selected from the group consisting of aromatic hydrocarbon-, glycol ester-, glycol ether-, ketone-, alcohol-based solvents and mixtures thereof.

20. The coating composition according to claim 18, further comprising: 3 to 13% by weight of a cross-linking agent; 0.1 to 1.5% by weight of a curing catalyst; 0.3 to 10% by weight of a slipping additive; 0.5 to 1.0% by weight of a leveling agent; 0.5 to 1.0% by weight of a defoaming agent; and 0 to 40% by weight of a pigment.

* * * * *